US011873083B2

(12) United States Patent
Daily, Jr.

(10) Patent No.: US 11,873,083 B2
(45) Date of Patent: Jan. 16, 2024

(54) DUCTED WING PROPULSION SYSTEM

(71) Applicant: Thomas Francis Daily, Jr., St. Louis, MO (US)

(72) Inventor: Thomas Francis Daily, Jr., St. Louis, MO (US)

(*) Notice: Subject to any disclaimer, the term of this patent is extended or adjusted under 35 U.S.C. 154(b) by 0 days.

(21) Appl. No.: 17/803,649

(22) Filed: Dec. 15, 2021

(65) Prior Publication Data

US 2023/0033249 A1 Feb. 2, 2023

Related U.S. Application Data

(60) Provisional application No. 63/125,558, filed on Dec. 15, 2020.

(51) Int. Cl.
*B64C 29/00* (2006.01)

(52) U.S. Cl.
CPC ................ *B64C 29/0016* (2013.01)

(58) Field of Classification Search
CPC ......... B64C 15/02; B64C 15/04; B64C 39/06; B64C 39/08; B64C 39/062; B64C 39/064; B64C 39/066; B64C 35/001; B64C 29/0066; B64C 29/02; B64C 21/02; B64C 15/14; B60V 1/046; B60V 1/18; B60V 3/00; B64U 30/10; B64U 30/295
See application file for complete search history.

(56) References Cited

U.S. PATENT DOCUMENTS

| | | | | |
|---|---|---|---|---|
| 2,468,787 A * | 5/1949 | Sharpe | .................. | B64C 39/064 244/45 R |
| 2,876,965 A * | 3/1959 | Streib | ..................... | B64C 39/06 244/52 |
| 3,104,853 A * | 9/1963 | Klein | ..................... | B64C 29/00 244/12.2 |
| 2018/0170561 A1* | 6/2018 | Daily, Jr. | ................ | B64D 33/02 |
| 2020/0086986 A1* | 3/2020 | LeGrand | ................ | B64C 11/46 |
| 2022/0119112 A1* | 4/2022 | Obermoser | .............. | B60V 1/10 |

* cited by examiner

*Primary Examiner* — Joshua J Michener
*Assistant Examiner* — Arfan Y. Sinaki
(74) *Attorney, Agent, or Firm* — Brett A. Schenck (57) ABSTRACT

An aircraft is provided. The aircraft includes a ducted wing portion and a fan chamber. The fan chamber is attached to a bottom of the ducted wing portion. A fan assembly is provided in the fan chamber and is operative to blow air through the ducted wing portion. The ducted wing portion is configured to direct air blown by the fan assembly down to provide lift for the aircraft.

12 Claims, 13 Drawing Sheets

DUCTED WING PROPULSION SYSTEM

CROSS-REFERENCE TO RELATED APPLICATIONS

This application claims benefit under 35 U.S.C. § 119(e) of Provisional Application No. 63/125,558 filed Dec. 15, 2020, the disclosure of which is incorporated by reference in its entirety.

FIELD

This application relates to a ducted wing propulsion system.

BACKGROUND

Known aircraft, such as helicopters blow the air flow down to achieve lift. Helicopters are a type of rotorcraft in which lift and thrust are supplied by rotors. This allows the helicopter to take off and land vertically, to hover, and to fly forward, backward, and laterally. These attributes allow helicopters to be used in congested or isolated areas where fixed-wing aircraft cannot perform. The fan blade of helicopters is exposed to the atmosphere where bird strike could cause loss of control of the aircraft. Helicopters often cannot get close to brush, trees, and down power lines, since the trees may hit the spinning blades and damage them. The blade damage may be so severe that the helicopter crashes. Helicopters also require exterior moving parts, which are subject to damage. There are quadcopters that have shroud or circular metal tubing, to help protect blades from bumping into things and causing crash.

Helicopter and other aircraft may benefit from improvements.

SUMMARY

In one aspect of the present invention, an aircraft is provided. The aircraft includes a ducted wing portion and a fan chamber. The fan chamber is attached to a bottom of the ducted wing portion. A fan assembly is provided in the fan chamber and is operative to blow air through the ducted wing portion. The ducted wing portion is configured to direct air blown by the fan assembly down to provide lift for the aircraft.

Other aspects of the disclosed invention will become apparent from the following detailed description, the accompanying drawings and the appended claims.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
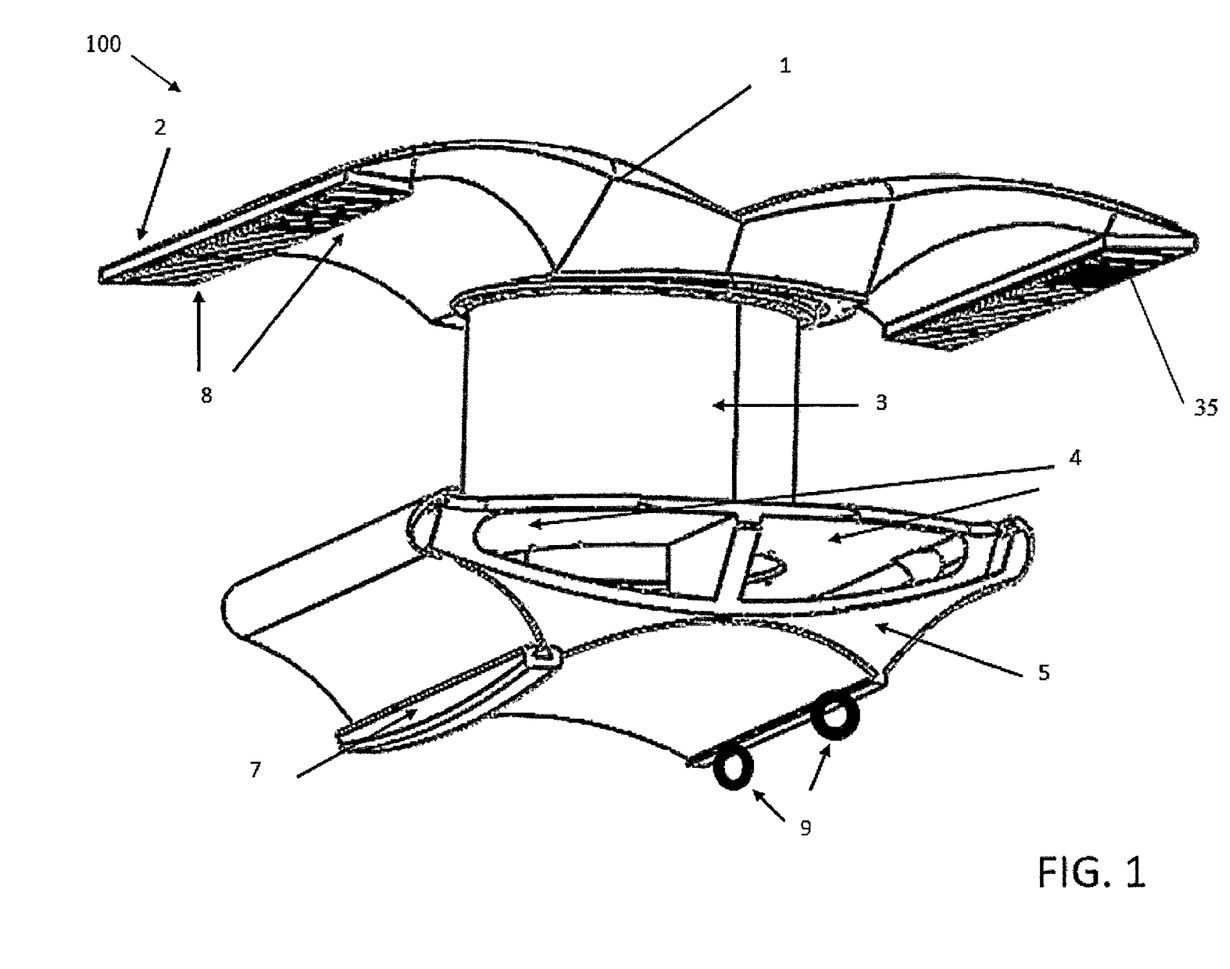
FIG. 1 is a bottom, front and right perspective view of the aircraft according to an embodiment of the present invention.

Throughout the present description, the terms "upper", "lower", "top", "bottom", "left", "right", "front", "forward", "rear", and "rearward" shall define directions or orientations with respect to the flying watercraft as illustrated in FIG. 1. It will be understood that the spatially relative terms "upper", "lower", "top", "bottom", "left", "right", "front", "forward", "rear", and "rearward" are intended to encompass different orientations of the flying watercraft in use or operation in addition to the orientation depicted in the figures. For example, if the flying watercraft in the figures is turned over, elements described as "upper" elements or features would then be "lower" elements or features.

Figure 2:
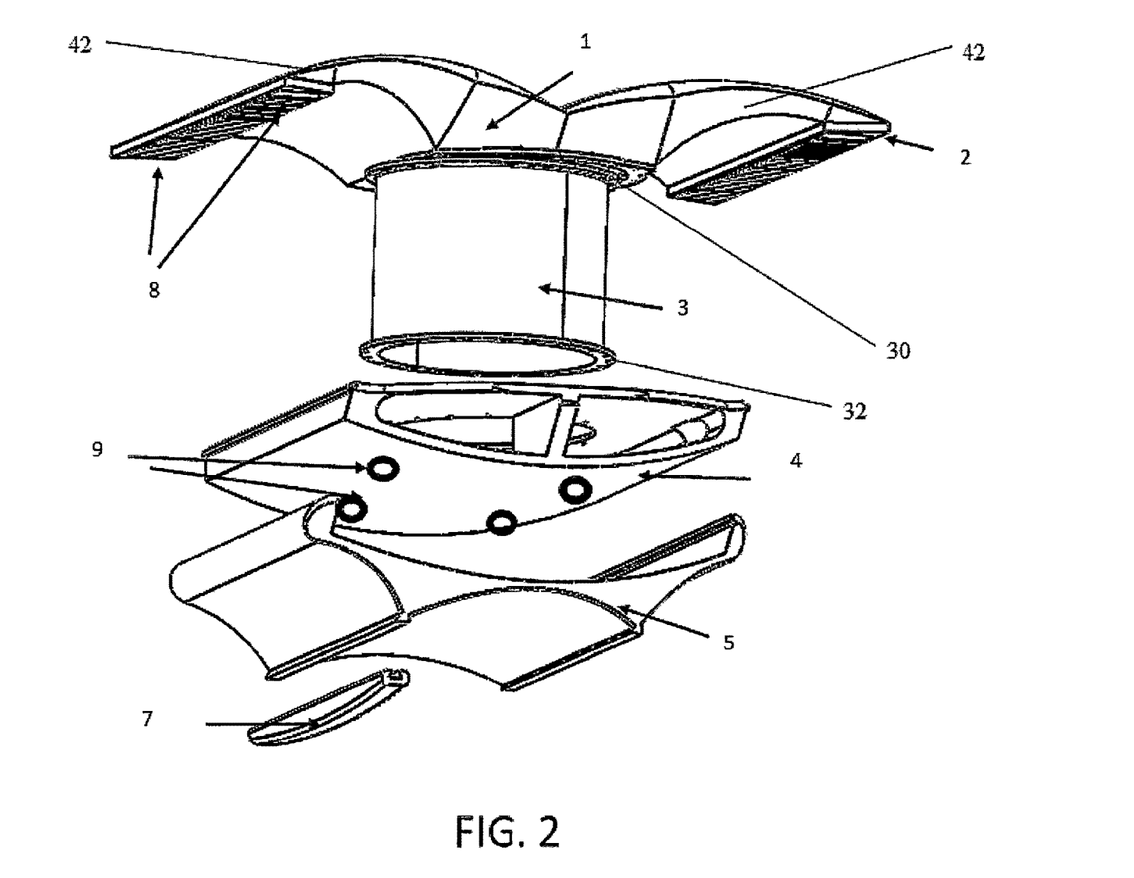
FIG. 2 is a bottom front exploded view of the aircraft of FIG. 1.

Referring to FIGS. 1 and 2, an aircraft 100 is provided that shows a propulsion system that includes a ducted wing part 1, that allows the lifting airflow force, to exit out at the wing tips 2. The aircraft 100 may also be a flying watercraft. The flying watercraft may be a helicopter. The ducted wing part 1 can be many different sizes and shapes to achieve the same or close to the same results. There is a fan chamber 3 attached to the bottom of the ducted wing part 1. The fan chamber 3 includes an upper mounting flange 30 for mounting to the bottom of the ducted wing part 1 and a lower mounting flange 32 for mounting to the top of a cargo decking air intake part 4. The fan chamber 3 houses upper and lower fan assemblies 36, 38 that have rotor blades 15 (FIGS. 10 and 11) and are powered by one or more motors 37. The fan chamber 3 may be configured to enclose the entire fan assemblies 36, 38 and motors 37 such that they are not exposed to the outside, thereby protecting them from debris, birds, or other objects. There could be many smaller motors in the ducted wing exit ports 35 to achieve the same lifting effect. More than one set of counter rotating fan blades or turbofans can be used in the fan chamber 3.

Figure 10:
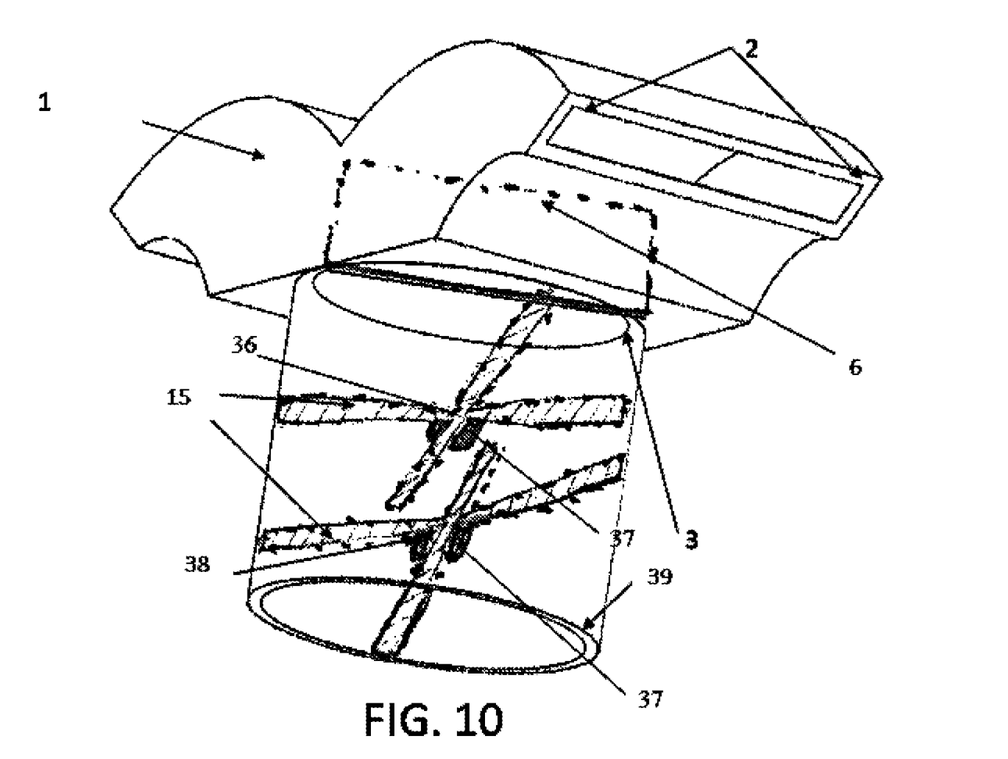
FIG. 10 is a side and bottom perspective view a portion of the aircraft of FIG. 1 showing the duct wing part, fan chamber, fan assemblies, and related components inside the fan chamber.
Figure 11:
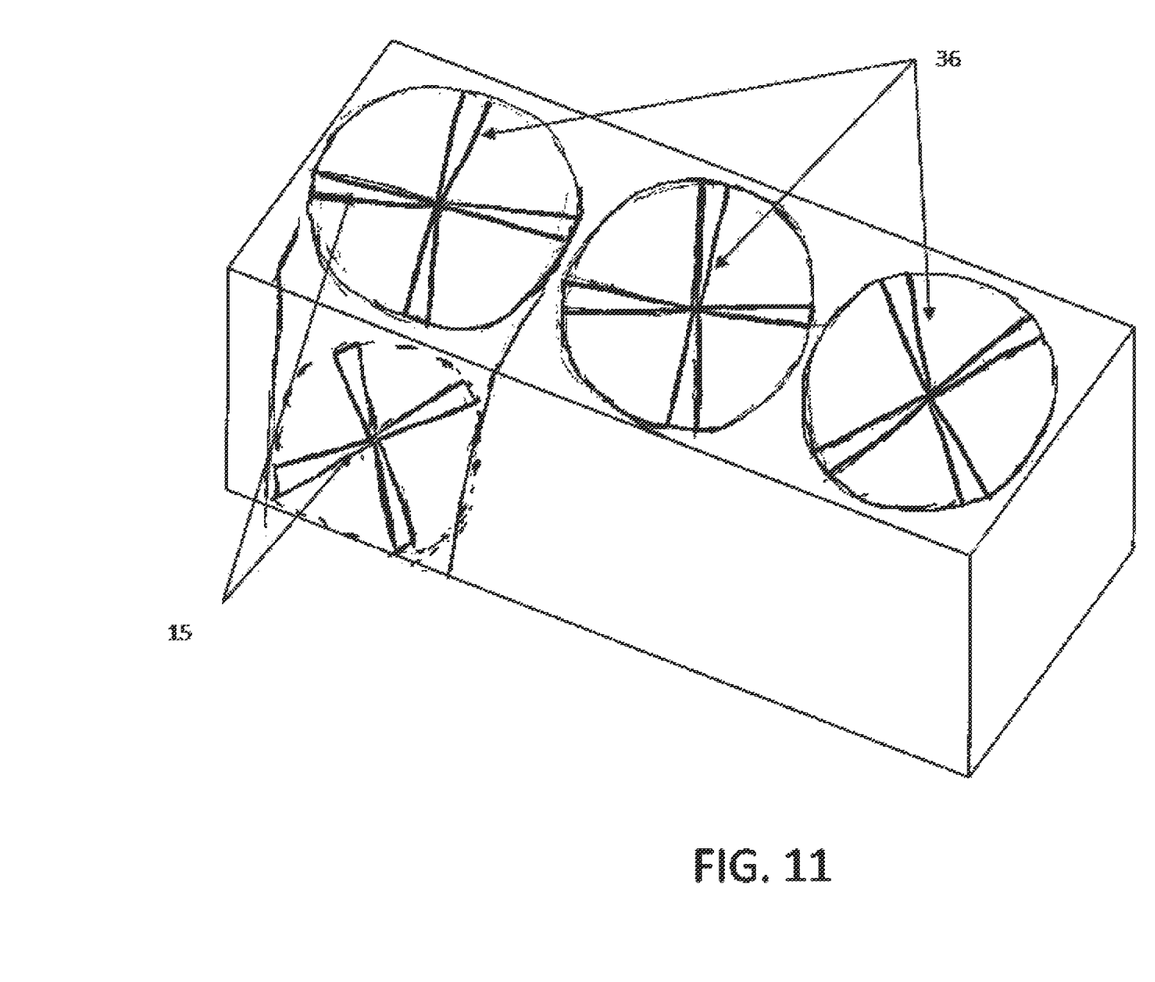
FIG. 11 is a top perspective view of a portion of the fan chamber showing the fan assemblies inside the fan chamber.
Figure 12:
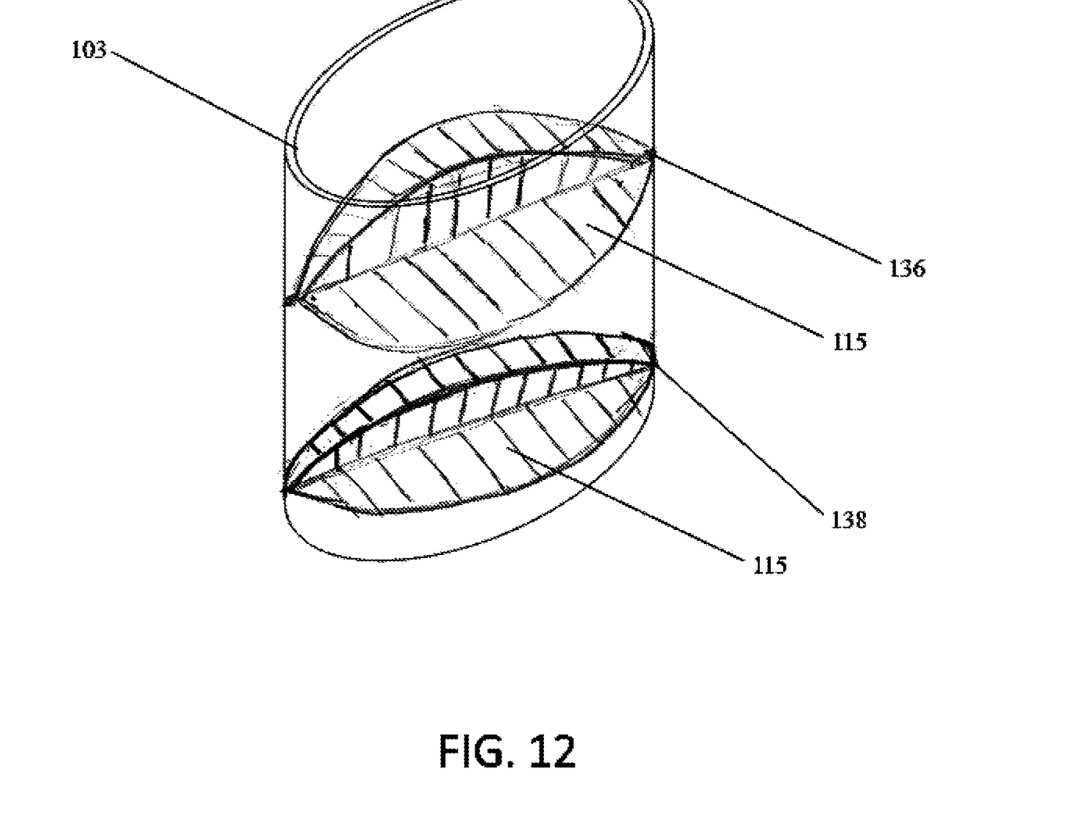
FIG. 12 is a top perspective view of a portion of an alternate version of the fan chamber and the fan assemblies inside the fan chamber with the fan chamber being transparent to show the fan assemblies according to the present invention.
Figure 13:
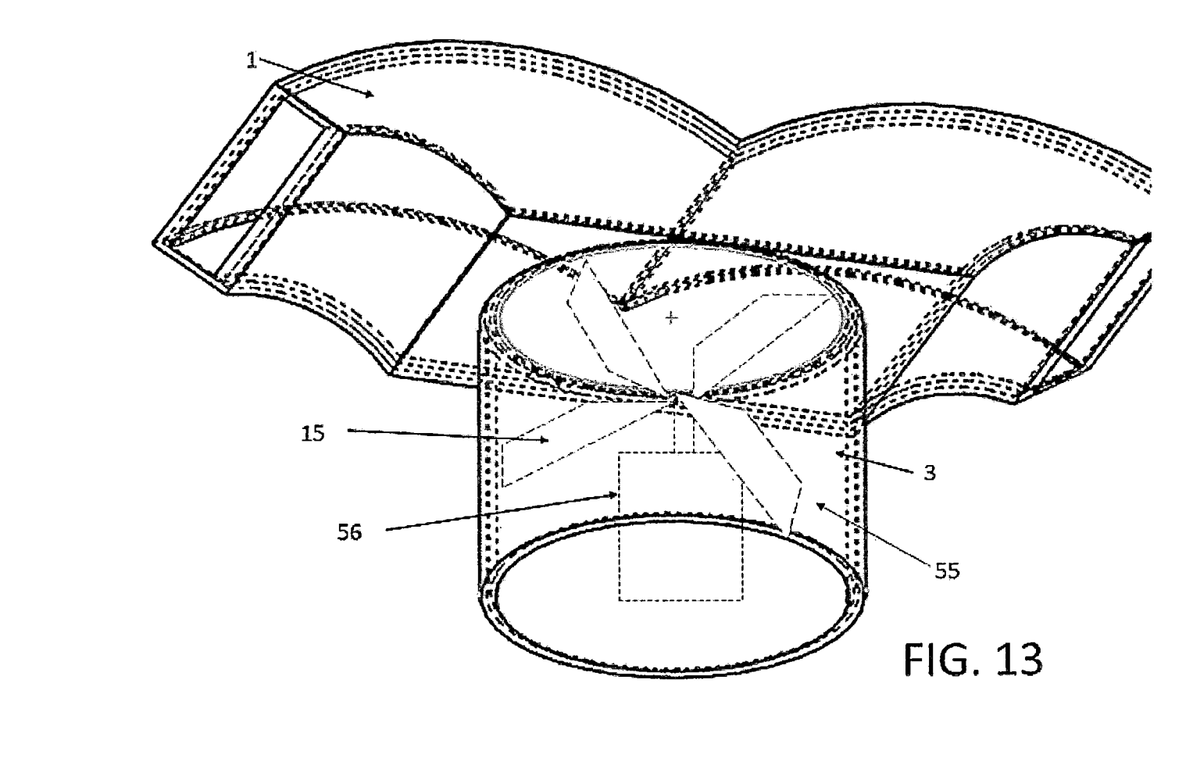
FIG. 13 shows a front perspective view of a portion of the aircraft showing the fan chamber and the ducted wing part and a fan assembly being powered by one motor located inside the fan chamber.

The fan chamber 3 may include an electric fan or multiple fans to force the air up into the ducted wing part 1. For example, FIGS. 10 and 11 show an upper fan assembly 36 and a lower fan assembly 38 beneath the upper fan assembly 36. The upper and lower fan assemblies 36, 38 may be counter rotating fan assemblies. Motors 37 are operatively connected to the upper and lower fan assemblies 36, 38 to turn the counterrotating fan blades 15 about a generally vertical axis. The motors 37 may be any suitable type of motor such as an electric motor or piston motor. Alternatively, there may be only one motor operatively connected to both of the upper and lower fan assemblies 36, 38 to turn the counterrotating fan blades 15 to create lift for the aircraft 100. FIG. 11 shows three upper fan assemblies 36 that have blades 15 arranged in a cross shaped configuration. The upper fan assemblies 36 fit inside the rectangular fan chamber 3. One or more lower fan assemblies 38 may be provided beneath the upper fan assemblies 36. The upper and lower fan assemblies 36, 38 may be counter rotating fan assemblies. In an alternative arrangement, FIG. 12 shows an oval shaped fan chamber 103 that contains oval shaped counter rotating fan blades that rotate about a horizontal axis. An upper fan assembly 136 with a set of fan blades 115 that has two or more fan blades is provided in the fan chamber 103, and a lower fan assembly 138 with a second set of fan blades 115 that has two or more fan blades is provided in the fan chamber 103 below the upper fan assembly 136. The upper and lower fan assemblies 136, 138 may be counter rotating fan assemblies. FIG. 13 shows an alternative arrangement showing only one fan assembly 55 located inside the fan chamber 3. The fan assembly 55 is operated by one motor 56 located inside the fan chamber 3.

Alternatively, the fan chamber 3 may house a jet engine that forces the air flow up into the ducted wing part 1. A jet engine could also be used as the thrust force in the fan chamber 3. More than one engine may be used. One engine blowing air out one side of the aircraft's wing tip 2 and another engine blowing air out the other side of the aircraft's wing tips 2 may be provided in the fan chamber 3. The heat from the jet engine could be used to deice the ducted wing part 1. The airflow thrust can be going up or it could be going down or the airflow could be going horizontally from the turbofans or jet engines.

The fan chamber 3 and the ducted wing part 1 are the main components of the design. These drawing designs favors the thrust airflow going up but could also be designed as stated above. The ducted wing part 1 attaches to the top of the fan chamber. The duct wing part 1 has an inlet 51 (FIG. 6) that is in fluid communication with an outlet 40 (FIG. 8) of the fan chamber 3. The ducted wing part 1 includes opposite arm portions 42 (FIG. 2) that extend radially outwardly from the inlet 51. Each arm portion 42 bends the air flow causing a G force as the air flow turns back toward the ground to give lift. A straight pipe does not have this G force. The inverted U-shaped bend of the arm portion lets the air flow smoothly since the 45 and 90 degree turns cause turbulence and are less efficient. In essence, each arm portion 42 curves upwardly from the outlet of the fan chamber 3 and then downwardly as the arm portion 42 extends radially outwardly defining an inverted U-shaped bend.

Figure 6:
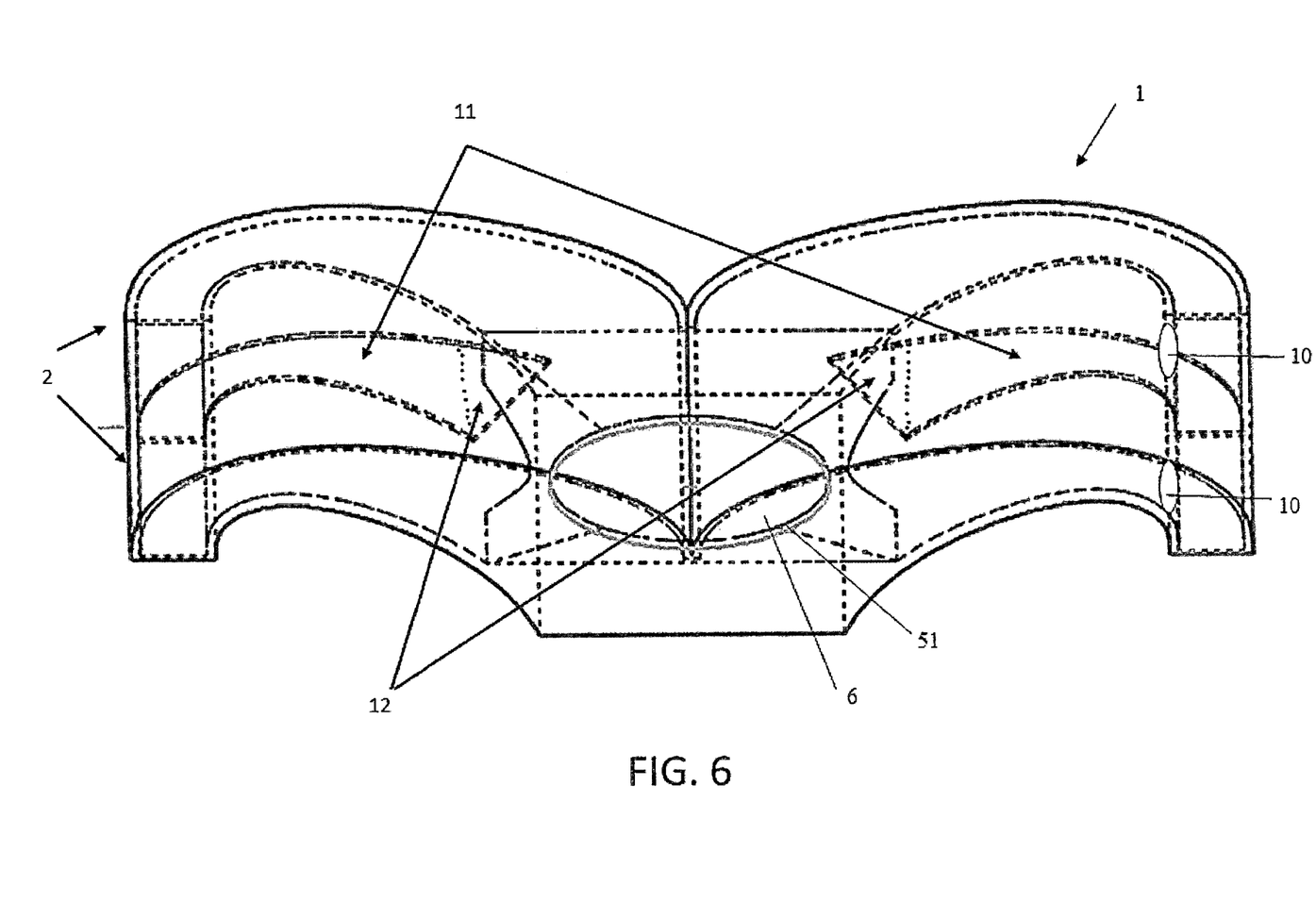
FIG. 6 is a top and rear perspective view of a portion of the aircraft of FIG. 1 showing the duct wing part and related components inside the duct wing part.
Figure 7:
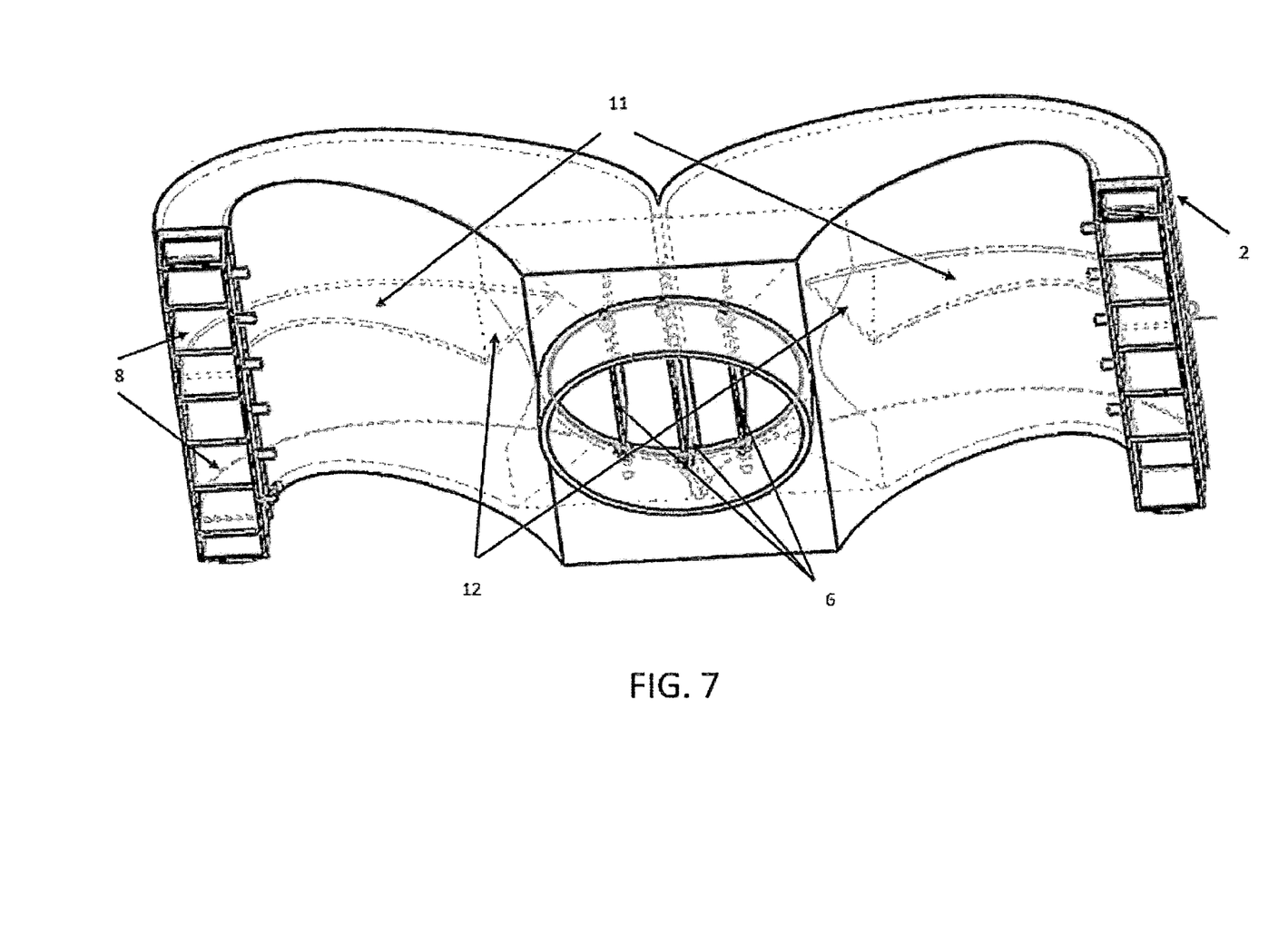
FIG. 7 is a bottom and rear perspective view a portion of the aircraft of FIG. 1 showing the duct wing part and related components inside the duct wing part.

The wing tips 2 could have multiple sets of flaps 8 on each side of the aircraft 100. As illustrated in FIG. 7, there may be one set of flaps 8 or multiple sets of flaps 8 for steering the aircraft 100. These flaps 8 may be designed to control all the steering functions of the aircraft 100. Round or oval shaped swivel nozzles can be used at the wing tip exit ports 2 for steering instead of 8 flap sets. High Speed Wind Generators 10 (FIG. 6) may be attached at the wing tip exit ports 2 of each arm portion 42. The High Speed Wind Generators 10 produce electricity to help power the aircraft.

Figure 8:
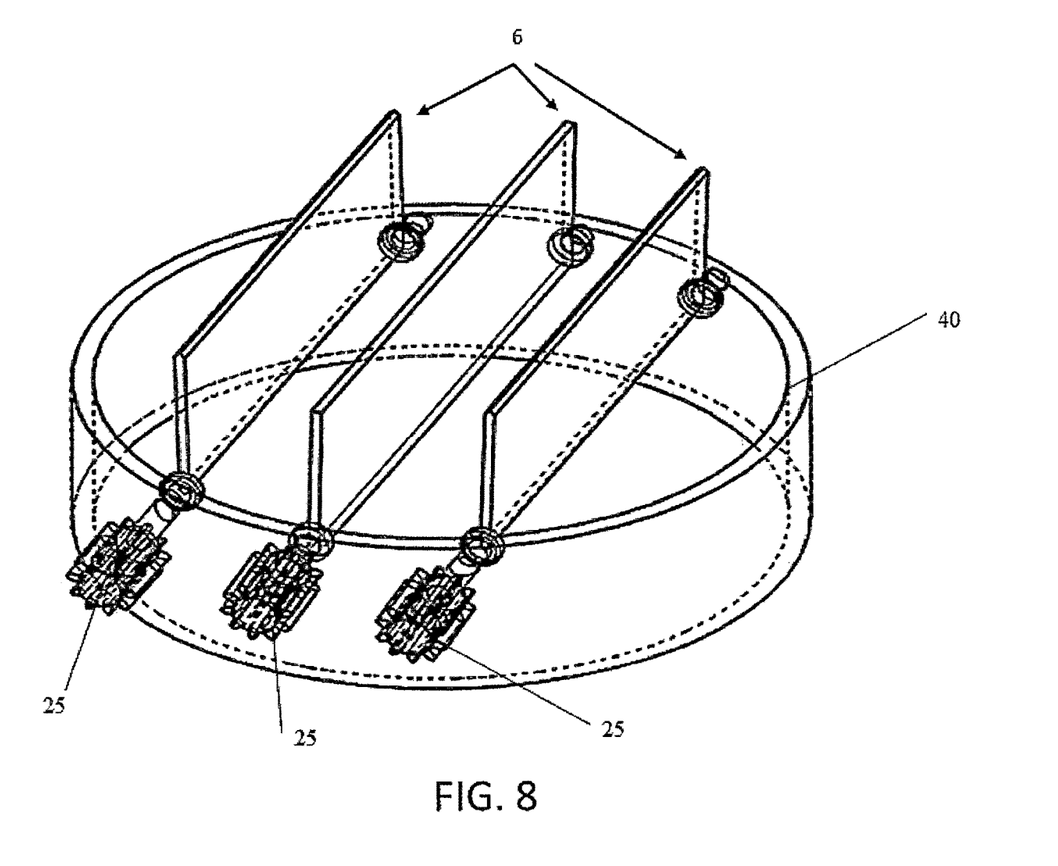
FIG. 8 is a top and side perspective view of the inlet of the duct wing part.
Figure 9:
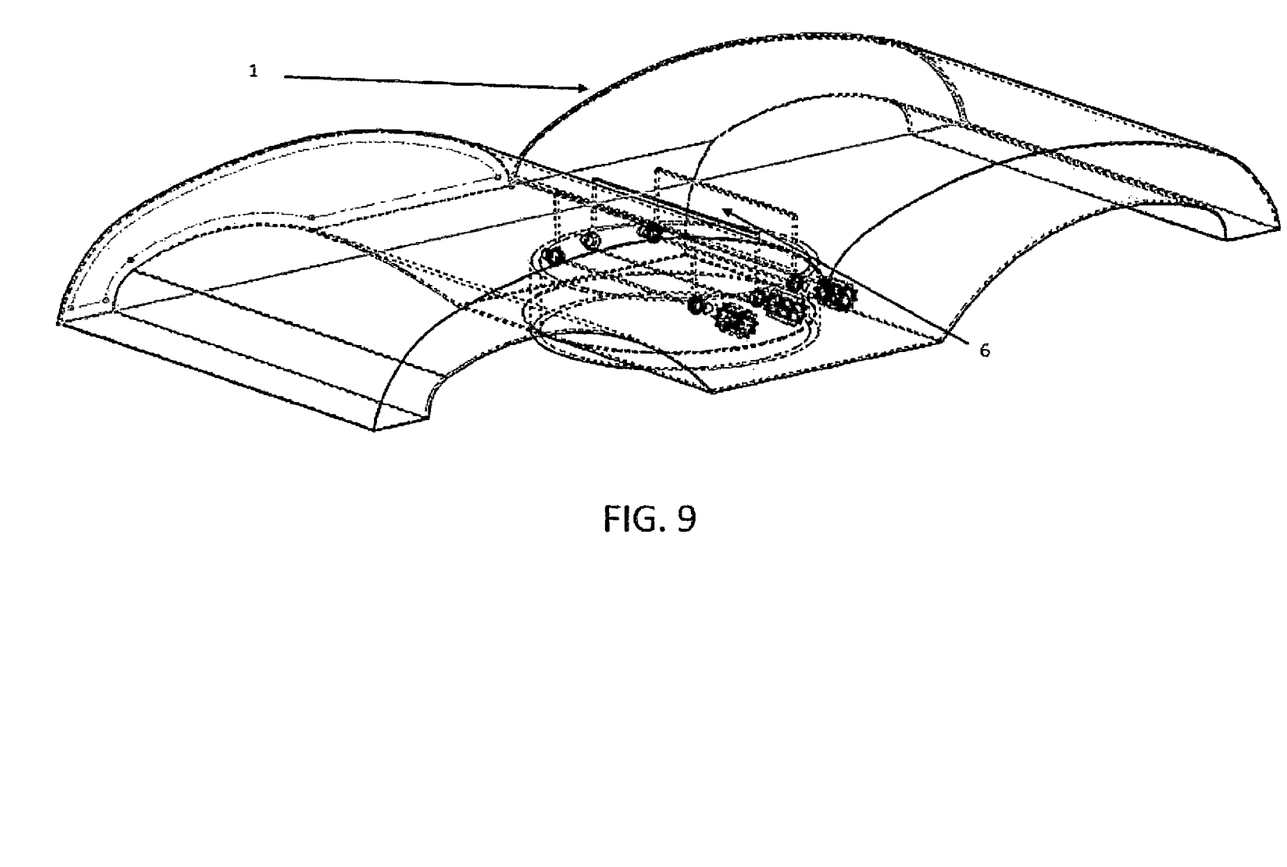
FIG. 9 is a front and right side perspective view a portion of the aircraft of FIG. 1 showing the duct wing part and related components inside the duct wing part.

As seen in FIGS. 7-9, there are center diverter flaps 6 that can be used for controlling the roll and pitch and yaw of the aircraft 100. This is another way to steer the aircraft 100. This technique splits the air flow at conception, with a flap 6 or more than one flap 6, attached to the top of the fan chamber 3. Thus, air flow can be control through each arm portion 42. Pivoting movement of the one or more diverter flaps allow the aircraft 100 to tip to the right and to the left. There is at least one flap 6 that pivotally attaches to the top of the fan chamber 3 from the front to the back direction of the aircraft 100 and a flap 6 that pivotally attaches to the top of the fan chamber 3 from side to side. The center diverter flaps 6 would be in a cross shape on top of the fan chamber 3. The center diverter flaps 6 can control the roll, pitch, and of the aircraft 100. The flaps 6 are controlled by motors 25. A center wall 11 (FIG. 6) may be provided in the ducted wing part 1 to split the airflow from front to back to help control the pitch of the aircraft 100. A set of center wall flaps 12 may also be provided in the ducted wing part 1 to control the pitch of the aircraft 100 as seen in FIG. 6. Optionally, exterior flaps could be used to help steer the aircraft 100 as needed, like traditional airplanes for more control-.

Figure 3:
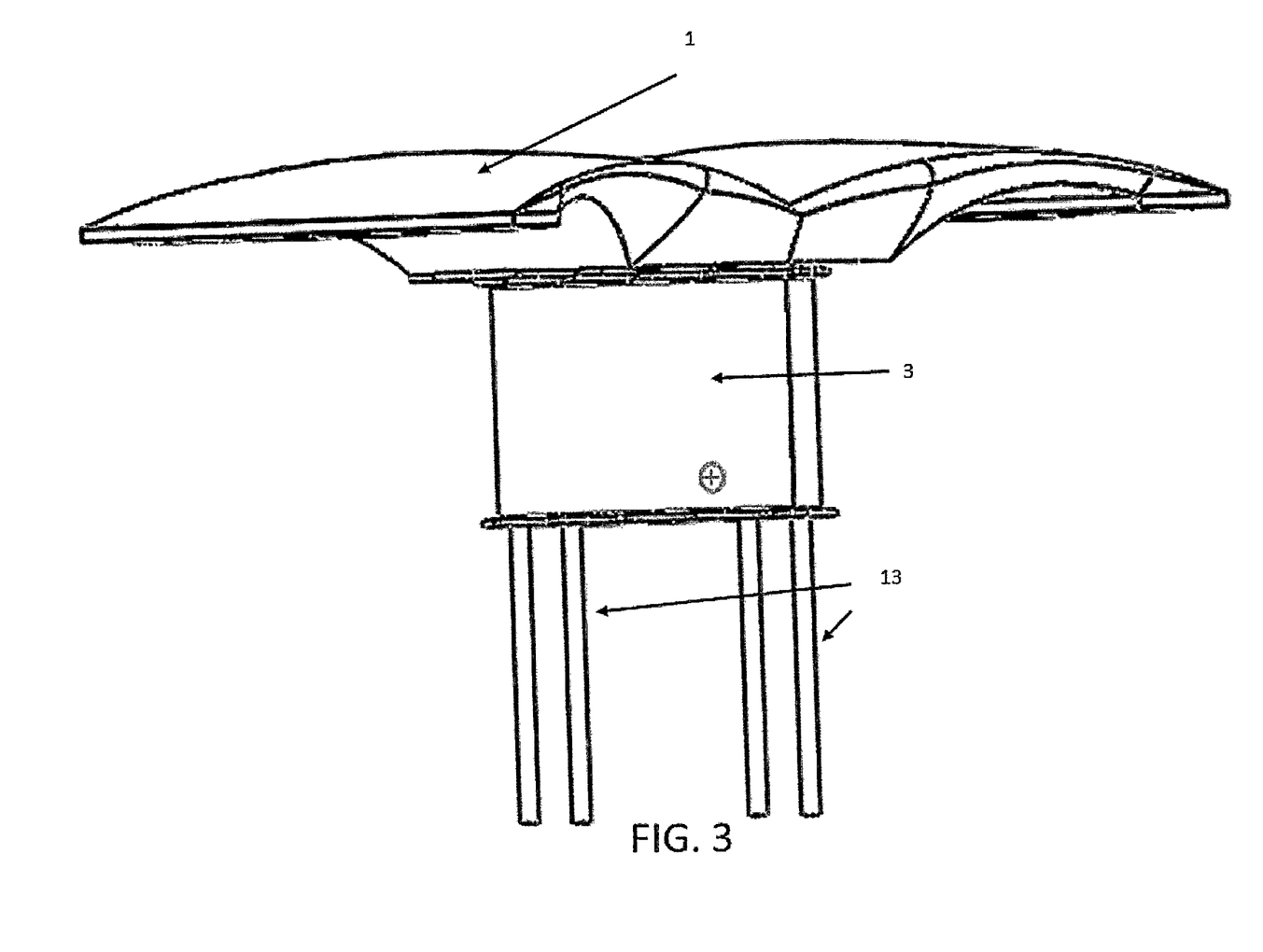
FIG. 3 is a front perspective view of a portion of the aircraft of FIG. 1.
Figure 4:
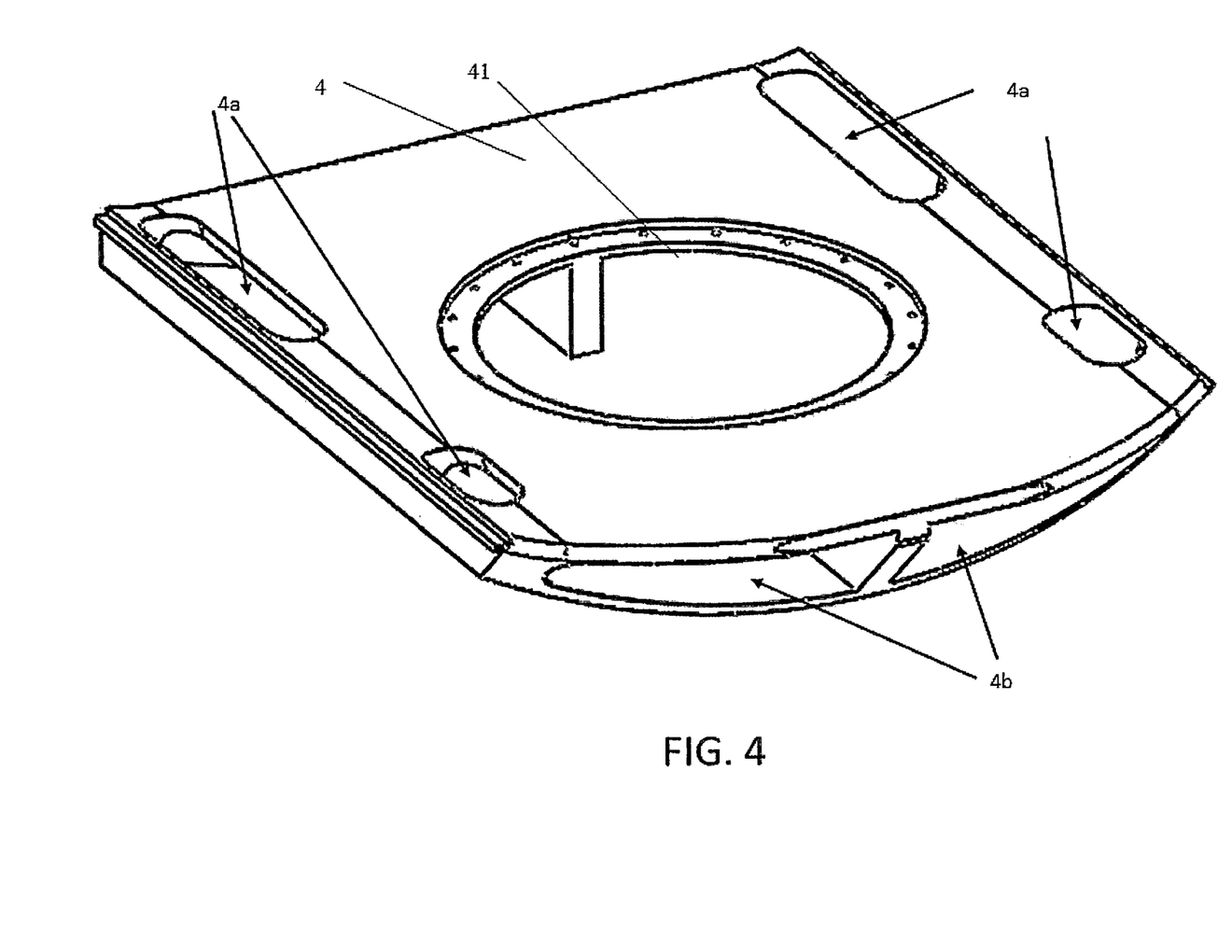
FIG. 4 is top and front perspective view of the cargo decking air intake part of the aircraft of FIG. 1.

As seen in FIG. 3, the fan chamber 3 may have long legs 13 attached, to hold the aircraft 100 off the ground, so that the air intake through an inlet 39 of the fan chamber 3 is not directly sucking on the ground. The fan chamber 3 with landing legs 13 attached and the ducted wing part 1, are the main structural components needed to fly the aircraft 100. As depicted in FIGS. 2 and 4, the cargo decking air intake part 4 may be optionally provided to allow cargo to be placed on the decking surface for transportation. The air intake cargo decking part 4 attaches to the bottom of the fan chamber 3. Inlet 39 of the fan chamber 3 is fluidly connected to outlet 41 of the air intake cargo decking part 4. Top air intake openings 4a are located on the top of the air intake cargo decking part 4. This allows the air to be pulled in from the top of the decking, so it will not pick up debris into the fan chamber 3. There is also side air intake openings 4b that are located on the front side of the air intake cargo decking part 4.

Figure 5:
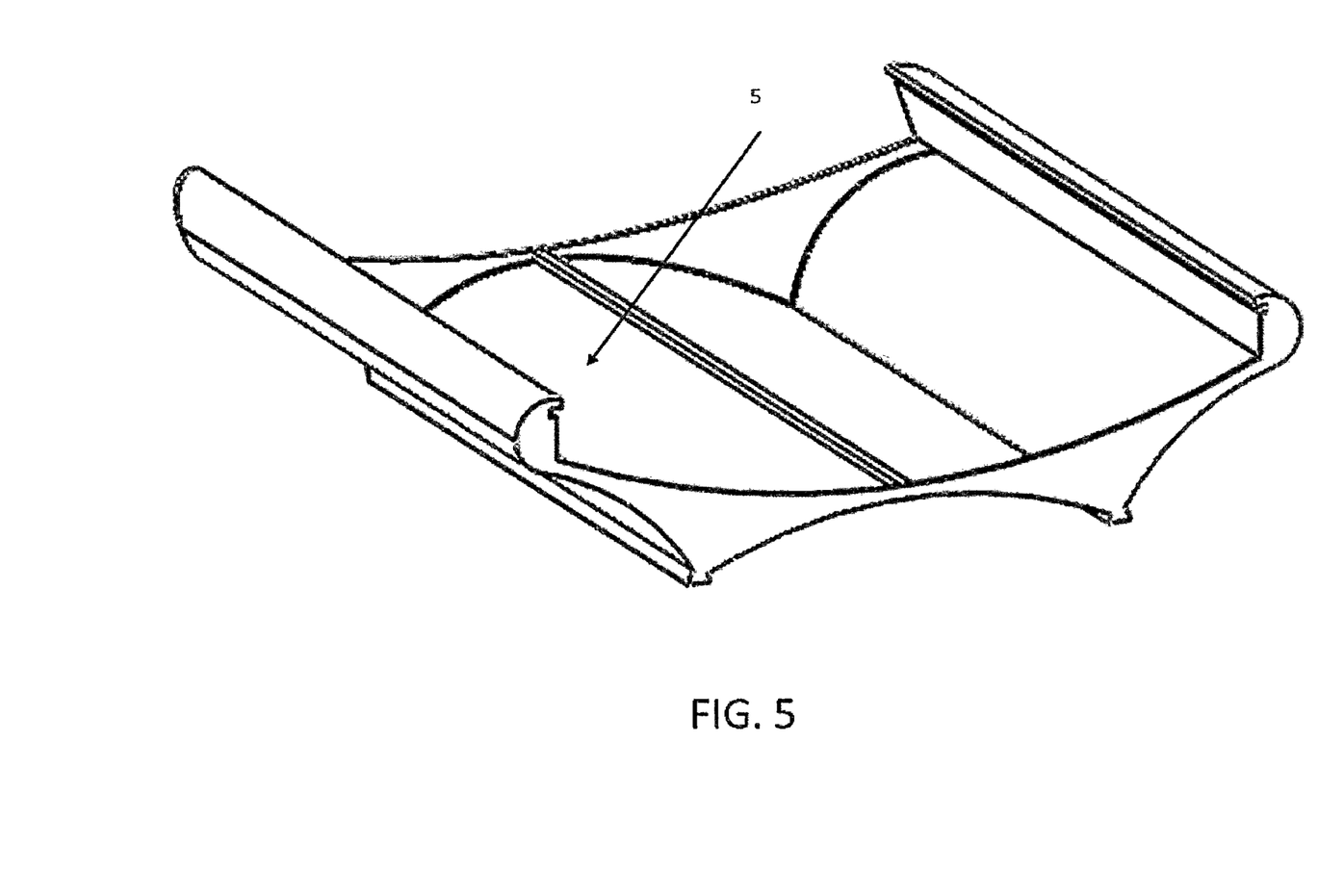
FIG. 5 is a top and rear perspective view of the boat bottom of the aircraft of FIG. 1.

The air intake openings 4a draw air into the air intake cargo decking part 4 and the air flows out of the outlet 41 of the air intake cargo decking part 4 and into the fan chamber 3 via the inlet 39 upon operation of the fan assemblies 36, 38. The air intake cargo decking gives a place to load the cargo onto the aircraft 100. Wheels 9 (FIGS. 1 and 2) may be added to the bottom of the cargo decking air intake part 4 for ground use. A boat bottom part 5 (FIGS. 1, 2, and 5) attaches to the air intake cargo decking part 4. The boat bottom part 5 allows the aircraft 100 to land on water. The boat bottom part 5 is designed to fly in ground effect over water or flat dessert areas. The boat bottom part 5 is made to have a crumple zone to help absorb the impact of a crash. The whole boat bottom part 5 can be torn off and the aircraft 100 will still be able to fly. The boat bottom part 5 is a safety feature that along with hydro skies 7 (FIGS. 1 and 2) are design to help with hard impacts. The hydro skies 7 are a replaceable part if damaged and so is the boat bottom part 5. The hydro skies 7 help to move the aircraft 100 with less friction on the water.

The air intake can be designed to work in different configuration. The air intake air flow is used to cool the electric motors, batteries, and hardware as needed. The cargo decking air intake part 4 attaches to the bottom of the fan chamber part, to create a decking area for cargo or people. The cargo decking air intake part 4 can use four wheels 9 attached to the bottom of the aircraft 100 to land on the ground. The boat bottom part 5 that attaches to the cargo decking air intake part 4. The boat bottom part 5 can land on water or land, but has no wheels 9 to taxi around. Counter rotating fan blades 15 can be used in the fan chamber 3 to create the thrust force. Both counter rotating fan assemblies 36, 38 may be needed for vertical lift. Once there is enough forward speed the wing will carry the weight of the aircraft 100. In forward flight, one of the counter rotating fans can be turned off to save on fuel.

Air flow flows from the intake through the fan chamber 3 and then through the duct wing part 1. The air flow exiting the ducted wing part 1 does not let the oncoming air flow, in forward flight, to escape at the wing tips 2. The oncoming air flow is trapped and is forced to flow the full length of the arm portions 42 of the ducted wing part 1. There is a trough of air flow at each wing tip 2 exiting at 300 to 600 m/s, depending on a design that is slower and more efficient or a design that is fast and less efficient.

The fan chamber 3 diameter size can be many different sizes, depending on efficiency that you want to achieve. The ducted wing part 1 can be many different sizes and shapes, depending on how much cargo you want to carry or how fast you want to fly. Many different engine sizes can be used to match the ducted wing part's size for different missions. There can be hundreds of different flying aircraft designs derived from the ducted wing propulsion system.

A parachute can be used for emergency landings. There is an airbag system that can deploy on the outside of the aircraft 100 to help with hard landings. The pilot and copilot have air bags like in cars. Having multiple sets of flaps 8 at each wing tip 2 gives the aircraft 100 redundancy. If one set of flaps 8 gets stuck, there is enough steering from the other sets of flaps 8, to safely land the aircraft 100. Sound dampening walls may be provided inside the ducted wing part 1 to lower acoustic signature.

If one of the counter rotating fan assemblies stops working in forward flight, the other fan assembly has enough power to land the aircraft 100 like a regular airplane. In forward flight one of the counter rotating fans can be shut down to fly more efficiently. The other motor can engage at any time if the aircraft 100 needs an extra boost of speed. If one of the counter rotating fans stops working while in hover mode, a parachute may be deployed to soften the landing or exterior airbags for the whole aircraft 100.

Using one fan and two motors could help in safety, if one motor fails the other motor has enough power to land the aircraft 100 safely. The military can add laser and other energy weapons on the aircraft 100. The aircraft 100 can be built using multiple fuel sources. Hydrogen fuel cells to produce electric to turn electric motor with a fan, all electric, turbofan jet engine, and piston motor.

The aircraft 100 can be built using multiple fuel sources. Hydrogen fuel cells to produce electric to turn electric motor with a fan, all electric, turbofan jet engine, turbo generator to produce electricity to turn electric motor and fan, piston engine turning a generator to produce electricity to turn motor and fan, or a piston motor turning the fan direct drive.

Autonomous systems can fly the aircraft 100 without a pilot. GPS coordinates can be typed in or otherwise entered and the aircraft 100 will automatically fly to that location. No pilot is needed. Obstacle Avoidance software can be provided to detect other aircraft in the area. This new software will enable all aircraft to communicate with each other, to avoid collisions in the air.

The ducted wing part 1 and the fan chamber 3 with legs 13 attached are the main components of the aircraft 100. The air flows up into the ducted wing part 1 and out the wing tips 2 to create lift. Having two or more sets of flaps 8 on each side of the aircraft 100 gives the aircraft 100 redundancy. If one of the sets of flaps 8 gets stuck or malfunctions the aircraft 100 can still safely land.

The aircraft's design controls the power of a jet engine or turbofan with an electric are piston motor. The aircraft's design uses the thrust force from the turbofan to steer the aircraft 100 with internal flaps. The aircraft's speed is not limited like multi rotor aircraft 100 with their propeller blades exposed to the atmosphere. The aircraft 100 is quiet, fast, and safe. Sound echoing noise cancellation can be used inside the ducted wing part 1 to lower the noise signature. The aircraft 100 is stealthy compared to open rotor aircraft 100. The aircraft can bump into obstacles without catastrophic failure. The aircraft 100 may be designed to carry laser weapon and other energy weapons, to defeat any enemy threats. The aircraft 100 can move first responders, troops and cargo without the need for roads or airports.

Although various embodiments of the disclosed aircraft have been shown and described, modifications may occur to those skilled in the art upon reading the specification. The present application includes such modifications and is limited only by the scope of the claims.

What is claimed is:

1. An aircraft comprising:
   a ducted wing portion;
   a fan chamber, wherein the fan chamber is attached to a bottom of the ducted wing portion; and
   a first fan assembly, wherein the first fan assembly is provided in the fan chamber, wherein the first fan assembly is operative to blow air through the ducted wing portion, wherein the ducted wing portion is configured to direct air blown by the first fan assembly down to provide lift for the aircraft, wherein the ducted wing portion comprises opposite first and second arm portions, wherein each arm portion curves downwardly as the arm portion extends radially outwardly.

2. The aircraft of claim 1, further comprising a second fan assembly, wherein the first and second fan assemblies are counterrotating fan assemblies.

3. The aircraft of claim 1, wherein the ducted wing portion includes wing tips, wherein the wing tips include one or more flaps, wherein the flaps are operative to steer the aircraft.

4. The aircraft of claim 1, wherein the fan chamber is configured to enclose the first fan assembly to protect the first fan assembly.

5. The aircraft of claim 1, further comprising a motor, wherein the motor is operative to power the first fan assembly.

6. The aircraft of claim 1, further comprising high speed wind generators, wherein the high speed wind generators are attached at exit ports of the first and second arm portions.

7. The aircraft of claim 1, further comprising legs, wherein the legs are attached to the fan chamber and configured to position the aircraft off the ground.

8. An aircraft comprising:
a ducted wing portion;
a fan chamber, wherein the fan chamber is attached to a bottom of the ducted wing portion; and
a first fan assembly, wherein the first fan assembly is provided in the fan chamber, wherein the first fan assembly is operative to blow air through the ducted wing portion, wherein the ducted wing portion is configured to direct air blown by the first fan assembly down to provide lift for the aircraft, wherein the ducted wing portion comprises opposite first and second arm portions, wherein the fan chamber includes diverter flaps, wherein the diverter flaps are operative to control air flow through exit ports of the first and second arm portions to control the roll, pitch, and yaw of the aircraft.

9. An aircraft comprising:
a ducted wing portion;
a fan chamber, wherein the fan chamber is attached to a bottom of the ducted wing portion; and
a first fan assembly, wherein the first fan assembly is provided in the fan chamber, wherein the first fan assembly is operative to blow air through the ducted wing portion, wherein the ducted wing portion is configured to direct air blown by the first fan assembly down to provide lift for the aircraft, wherein the aircraft comprises an air intake part positioned below the fan chamber and fluidly connected to the fan chamber, wherein the air intake part includes air intake openings located on a top of the air intake part and facing upwardly to draw air downwardly into the intake part and upwardly through the fan chamber.

10. The aircraft of claim 9, wherein the air intake part is configured to enable the aircraft to land on water or land.

11. An aircraft comprising:
a ducted wing portion;
a fan chamber, wherein the fan chamber is attached to a bottom of the ducted wing portion;
a first fan assembly, wherein the first fan assembly is provided in the fan chamber, wherein the first fan assembly is operative to blow air through the ducted wing portion, wherein the ducted wing portion is configured to direct air blown by the first fan assembly down to provide lift for the aircraft; and
a center wall, wherein the center wall is provided in the ducted wing portion and is configured to split the airflow from front to back to help control the pitch of the aircraft.

12. An aircraft comprising:
a ducted wing portion;
a fan chamber, wherein the fan chamber is attached to a bottom of the ducted wing portion; and
a first fan assembly, wherein the first fan assembly is provided in the fan chamber, wherein the first fan assembly is operative to blow air through the ducted wing portion, wherein the ducted wing portion is configured to direct air blown by the first fan assembly down to provide lift for the aircraft; and
center wall flaps, wherein the center wall flaps are provided in the ducted wing portion and configured to control the pitch of the aircraft.

* * * * *